Aug. 9, 1960   J. R. HOLLINS   2,948,832
CONTROL SWITCHES FOR AUTOMOTIVE VEHICLES
Filed July 23, 1958

INVENTOR.
Jesse R. Hollins
BY
ATTORNEY

United States Patent Office 2,948,832
Patented Aug. 9, 1960

2,948,832

CONTROL SWITCHES FOR AUTOMOTIVE VEHICLES

Jesse R. Hollins, Brooklyn, N.Y., assignor to Signal-Stat Corporation, Brooklyn, N. Y., a corporation of New York Filed July 23, 1958, Ser. No. 750,418

4 Claims. (Cl. 315—82)

This invention relates to headlamp control switches for automotive vehicles and, more particularly, to novel means whereby such a switch may be used to operate its controlled lamp to provide an "emergency" or "flare" signal.

Headlamp control switches for automotive vehicles are conventionally three-position switches movable between "off," "parking lamps on," and "headlamps on" positions. In the latter position, a foot-operated switch controls the selection of the high beam and low beam headlamps or filaments. The switches may be either pull-out switches or rotary switches.

Control switches of this type are provided with an input terminal for connection to the battery and output terminals for connection to the parking lamps, the tail lamps and license plate lamps, the headlamps, and the instrument panel lamps. The tail and license plate lamps, as well as the instrument panel lamps are connected to battery in each of the "on" positions of the switch, but the connection to the instrument panel lamps is made through a rheostat having an "off" position so that these lamps may be selectively dimmed or even extinguished as desired. The connection to this rheostat is made to the terminals for the tail lamps and license plate lamps.

It has been proposed heretofore to modify the usual turn signal switch to provide for flashing of all the turn signal lamps as an "emergency stop" or "flare" warning. This has been effected, for example, by incorporating an additional switch operator in the turn signal selector switch effective to connect all the signal lamps simultaneously to battery through one or more flashers. While such arrangements operate satisfactorily in practice, their cost as part of additional "accessory" equipment including the necessity of rewiring for additional circuitry, limits the extent of use thereof.

In accordance with the present invention, it has been found that a flare signal can be incorporated economically in a headlamp control switch as utilized in "standard" equipment by a simple and inexpensive modification of the latter. More particularly, in a "standard" equipment headlamp control switch, a first contact is connected to the instrument panel lamp control rheostat at the end of the resistance winding of the latter corresponding to maximum brilliance of the instrument panel lamps. When the control rheostat is turned to this maximum brilliance position, this first contact engages a second contact mounted on the switch body. In addition, an extension strip is provided in such a manner that, in the "off" position of the switch, this extension strip and the movable circuit closer, carried by the switch control knob, interconnect the parking and tail lamp terminals. A flasher, or intermittent circuit interrupter, is connected between the battery terminal and the mentioned second contact.

With this arrangement, when the control rheostat is moved to or beyond the maximum brilliance position, with the headlamp control switch in the "off" position, current flows from the battery terminal through the flasher, the second contact, the first contact, and the tail lamp terminal in parallel with the parking lamp terminal. Thus, the parking and tail lamps are flashed as a "flare" warning signal.

Should the switch be moved to either "on" position, the steady current flow of the connected lamps will shunt the high resistance flasher so that the connected lamps will burn steadily. Of course, the flashing may be terminated at any time by turning the control rheostat away from its maximum brilliance position.

For an understanding of the invention principles, reference is made to the following description of a typical embodiment thereof as illustrated in the accompanying drawing.

Figure 1:
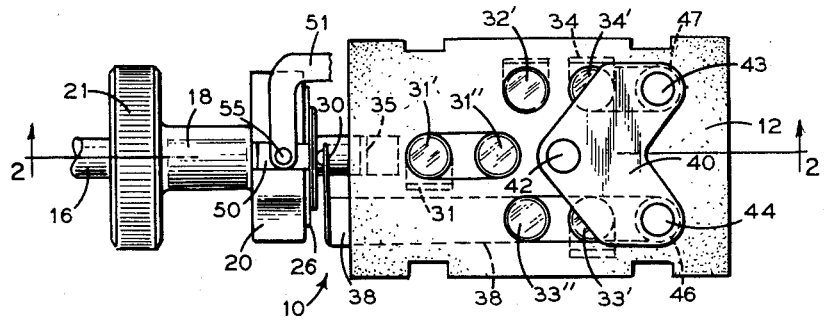
Fig. 1 is a side elevation view of a headlamp control switch embodying the invention.
Figure 2:
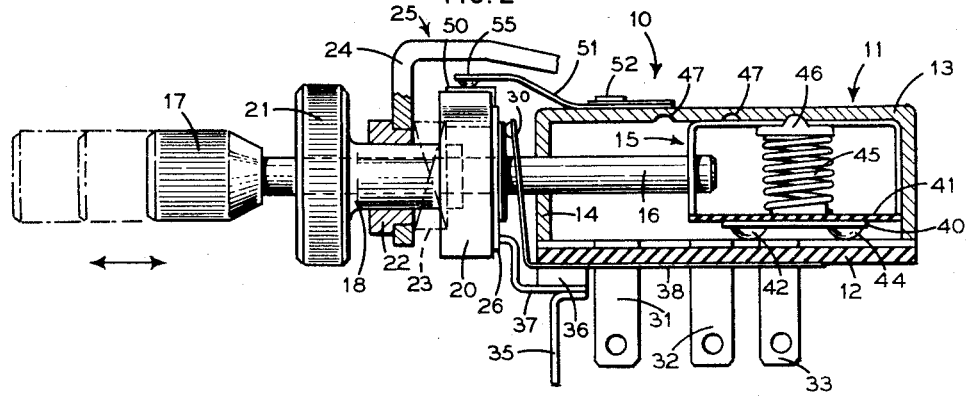
Fig. 2 is a view on the line 2—2 of Fig. 1.
Figure 3:
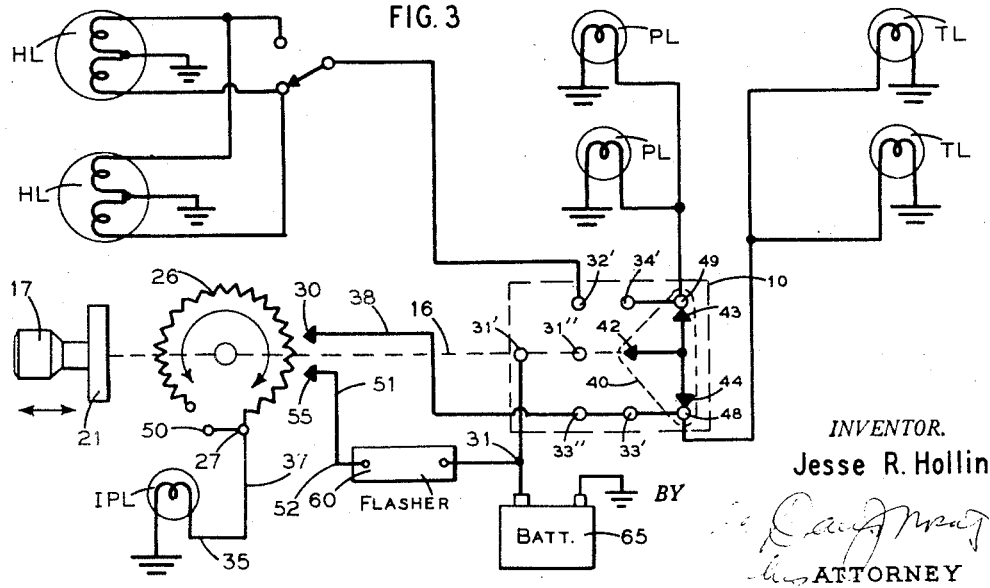
Fig. 3 is a schematic wiring diagram of the switch and its connected lamps.

Referring to Figs. 1, 2 and 3, the headlamp control switch 10 comprises a frame 11 including a dielectric base 12 and a U-shape upper frame member 13. A slide 15 is mounted for longitudinal displacement in frame 11, and is operated by a rod 16 extending through forward wall 14 of frame member 13 and having a switch operating knob 17 on its outer end.

In advance of wall 14, a sleeve 18 is rotatably telescoped on rod 16 and has a rheostat 20 secured to its inner end and an operating knob 21 secured to its outer end. Interconnectible bearing elements 22, 23 on sleeve 18 serve to mount switch 10 in a depending wall 24 of panel or dash 25.

Base 12 carries terminals 31–35 respectively connectible to "battery," "headlamps," "tail lamps," "parking lamps," and "instrument lamps." Each terminal 31–34 has a corresponding contact 31'–34' exposed on the upper surface of base 12. The battery and tail lamp terminals also include a second contact 31" and 33", respectively, exposed on the upper surface of base 12. Terminal 35 is mounted on an insulated block 36 and is connected by a wire 37 to one end of the torroidal resistance winding 26 of rheostat or variable resistance 20. A conductive strip 38 is connected to terminal 33 and terminates in a contact finger 30 bearing on resistance winding 26.

Slide 15 is a rectangular frame member including a dielectrtic base 41 on which is mounted a circuit closer plate 40 formed with "buttons" 42, 43, 44. Button 42 in off or neutral position is unengaged, but upon displacement of the slide is engageable respectively with contacts 31" and 31' leading to battery 60. Button 43 in off or neutral position is engageable with an extension of parking lamps contact 34' but upon displacement of the slide is successively engageable directly with parking lamps contact 34' in one position and with head lamps contact 32' in the other position. Button 44 in off or neutral position and in all displacement positions of the slide is engageable with tail lamps contacts 33' and 33" or extensions thereof. The buttons of circuit closer plate 40 are maintained firmly against base 12 and the associated contacts by means of a coil spring 45 seated on slide base 41 and carrying an indexing button 46 riding along frame member 13 and engageable in notches 47 in the inner surface of the latter at each of the three switch positions. Base 12 is provided with a pair of additional or extension contacts 48, 49 respectively electrically connected to contacts 33' and 34', and these additional contacts are interconnected by closer plate 40 in the "off" position of switch 10.

The switch, as so far described, operates in the following manner:

In the off or neutral position illustrated, closer plate 40 engages contact 48 which is connected to the tail lamps through contact 31' and engages contact 49 which is connected to the parking lamps through contact 34'. But since closer plate 40 does not engage a contact which is connected directly to the battery, or other source of current, no lighting circuit is established and the aforesaid lamps remain unlit.

When knob 17 is pulled out to its first on position, circuit closer 40 is displaced to the left until indexing button 46 is engaged with intermediate notch 47 of the frame member 13. In this position, plate 40 is electrically connected to battery 65 through contacts 31" and 31', and terminal 31. The parking lamps are thus energized through plate 40, contacts 34' and 47, and terminal 34, and the tail lamps are energized through plate 40, contacts 33', 48, and terminal 33. In addition, current is supplied to the instrument panel lamps from contact 33' through strip 38, finger 30, resistance winding 26, conductor 37 and terminal 35.

In the second on position of switch 10, with knob 17 pulled out its full extent, closer plate 40 disengages contacts 31", 32', and 34' and connects battery contact 31' to headlamps HL contact 32' and tail lamps TL contact 33". The headlamps are now illuminated, and the tail lamps and instrument panel lamps IPL remain illuminated.

The illumination of the instrument panel lamps may be varied by turning knob 21 to vary the amount of resistance in series with the instrument lamps. It will be noted that when rheostat 20 is turned to engage contact 27 (Fig. 3) with finger 30, resistance 26 is shunted out completely and full current flows to the instrument panel lamps IPL.

In accordance with the present invention, switch 10 is arranged to utilize the parking and tail lamps as flashing emergency warning lamps. For this purpose, a contact plate 50 is mounted on rheostat 20 adjacent terminal 27 of winding 26 and is electrically connected to winding 26. A spring conductor arm 51 is mounted in insulated relation on frame member 13 and has a free contact end 55 riding on rheostat 20 and engaging contact plate 50 in the full illumination position of the rheostat.

A flasher 60 is connected in series between battery terminal 31 (contact 31') and terminal 52 of spring conductor arm 51.

Referring to Fig. 3, which shows the lamps controlled by switch 10, the arrangement operates as follows. When knob 21 turns rheostat 20 to the position of full illumination of the instrument panel lamps IPL, contact 55 of spring conductor arm 51 engages contact 50. As the switch 10 is in the off or neutral position, contact plate 40 is conductively connected to both contacts 48 and 49, and thus to both the tail lamps TL and the parking lamps PL. These lamps TL and PL are simultaneously flashed over the following circuit: battery 65, terminal 31, flasher 60, terminal 52, conductor arm 51, contact 55, contact plate 50, winding 26, terminal 27, contact 30, strip 38, contact 33', terminal 33 (for the tail lamps TL), and contact 48, plate 40, contact 49, contact 34', and terminal 34 (for the parking lamps PL). Instrument panel lamps IPL are also flashed through the circuit from contact 55 over conductor 37 and terminal 35.

Should switch 10 be moved to either on position, the steady current to the lamps, over a relatively low resistance circuit, will shunt flasher 60 so that the lamps will be steadily illuminated.

While a pull-out control switch has been illustrated by way of example, it will be appreciated that a rotary control switch having a panel lamp dimming rheostat can be readily modified in the same manner to provide an emergency warning signal.

Further, if desired a pull out control switch may have the rheostat control a part of the pull out shaft assembly, thereby when the pull out shaft is rotated the rheostat is controlled.

While a specific embodiment of the invention has been shown and described in detail to illustrate the application of the invention principles, it will be understood that the invention may be embodied otherwise without departing from such principles.

What is claimed is:

1. In combination, an automotive vehicle headlamp control switch having battery, tail lamp, parking lamp and instrument panel lamp terminals, a switch operator movable between an off position, in which said battery terminal is disconnected from the other terminals, and an on position, connecting said battery terminal to said parking and tail lamp terminals, a rheostat including a resistance winding element and a contact arm element, circuit means connecting one element to said tail lamp terminal and the other element to said instrument panel lamp terminal, and control means selectively operable to effect relative rotation of said elements to vary the resistance in circuit between said tail lamp and instrument panel lamp terminals to vary the illumination of the instrument panel lamps in the on position of said switch operator; a contact adjacent and connected to said resistance element at substantially the part thereof engaged by said contact arm element in the position of said rheostat providing minimum resistance in the instrument panel lamp circuit and connected to said contact arm element only through said resistance winding element; a contact arm engageable only with said contact and only in such position of said rheostat; means, including said switch operator, interconnecting said parking lamp and tail lamp terminals in the off position of said switch operator; and a flasher connected between said battery terminal and said contact arm; whereby, when said contact arm is engaged with said contact and said switch operator is in the off position, said parking lamp and tail lamp terminals are connected to said battery terminal through said flasher for flashing of the parking lamps and tail lamps as emergency warning signals.

2. The combination claimed in claim 1 in which said control means rotates said resistance element and said contact arm element is relatively stationary.

3. The combination claimed in claim 1 in which said means interconnecting said parking lamp and tail lamp terminals includes a pair of extensions of said terminal engaged by a circuit closer carried by said switch operator.

4. The combination claimed in claim 1 in which said switch includes a frame on which said terminals are mounted; and said contact arm is supported on said frame and extends adjacent said rheostat.

References Cited in the file of this patent

UNITED STATES PATENTS

| | | |
|---|---|---|
| 2,521,561 | Batcheller | Sept. 5, 1950 |
| 2,550,145 | Geci | Apr. 24, 1951 |
| 2,812,396 | Hollins | Nov. 5, 1957 |
| 2,851,673 | Hollins | Sept. 9, 1958 |